United States Patent [19]

Bohler

[11] 3,739,164

[45] June 12, 1973

[54] DEVICE FOR COMPENSATING A DERIVED SIGNAL
[75] Inventor: Walter Bohler, Norwalk, Conn.
[73] Assignee: The Perkin-Elmer Corporation, Norwalk, Conn.
[22] Filed: June 21, 1971
[21] Appl. No.: 154,724

[52] U.S. Cl............. 235/197, 235/151.35, 328/145
[51] Int. Cl........................... G06g 7/24, G06g 7/26
[58] Field of Search................... 235/151.35, 151.3, 235/151.31, 197; 307/229; 328/145; 250/83 SA, 83.3 R, 43.5 R; 324/132; 356/96, 98, 106 S, 201, 213, 223, 224

[56] References Cited
UNITED STATES PATENTS

| 3,553,444 | 1/1971 | Tong............................. 235/151.35 |
| 3,245,304 | 4/1966 | Davis...................... 235/151.35 UX |
| 3,428,796 | 2/1969 | Martens et al............. 235/151.35 X |
| 3,513,467 | 5/1970 | Sliwkowski..................... 235/197 X |
| 3,582,659 | 6/1971 | Derker........................... 356/223 X |

Primary Examiner—Joseph F. Ruggiero
Attorney—Edward R. Hyde, Jr.

[57] ABSTRACT

A second derived signal is compensated over a particular range for undesired deviation caused by an error signal component in a first measured signal, from which the second signal is derived. A correction signal is algebraically added to the first signal at values on one side of an "onset" value (corresponding to the beginning of the particular range of the second derived signal). Where the error signal component is of constant value (causing a relative percentage error inversely proportional to the amplitude of the first signal), the correction signal will be proportional to the amount that the first signal is less than the "onset" value; this will cause a constant percentage error in the corrected first signal for all values at or below the onset value. The second derived signal will therefore now vary at least proportionally to the correct measured value for all values of the first signal on one side of (less than, in this case) the "onset" value. Values of the first signal at the "onset" value are not affected so that a single setting of the proportionality factor for the correction signal will cause the desired compensation of the derived signal over the particular range. In the exemplary use, the first measured signal is the apparent transmission of a sample material in a photometric system, the constant (positive) error component is the undesired stray radiation measured, and the second derived signal is the absorbance (a logarithmic function of the first transmission signal). The device will cause the compensated absorbance versus sample concentration to be a straight line and therefore acts as a so-called "curve straightener" in spectrophotometers (especially of the atomic absorption type).

8 Claims, 3 Drawing Figures

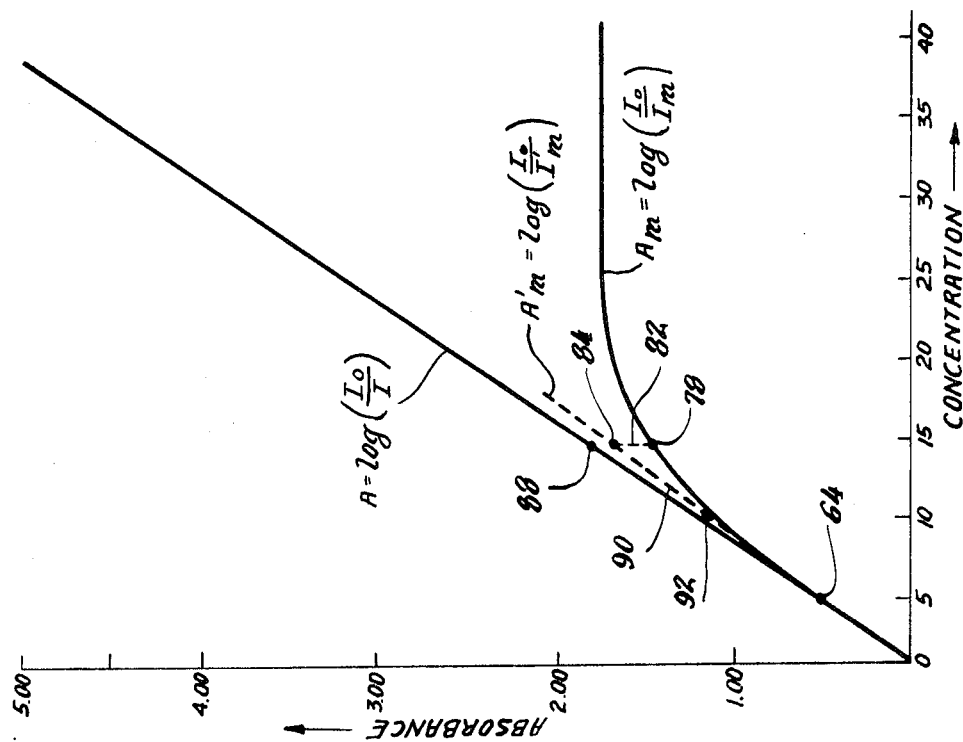
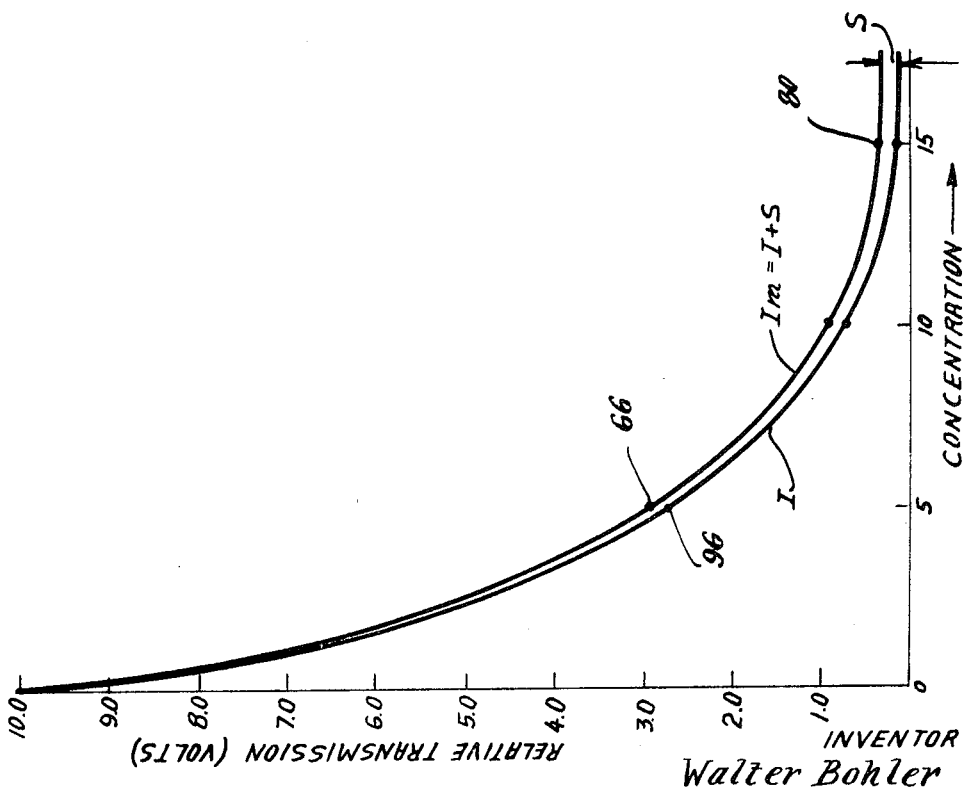

DEVICE FOR COMPENSATING A DERIVED SIGNAL

This invention relates to a device for compensating the deviation in a final signal, caused by an undesired signal component in a measured signal from which the final signal is derived More particularly, the inventive device algebraically adds a correction signal to the measured signal for values thereof on one side of a particular "onset" value so as to compensate the derived signal for the presence of an undesired "error" signal component in the first signal. The device does not affect the measured signal for values on the opposite side of the onset value, so that the derived signal may be compensated over a range of values on one side of its corresponding onset value without affecting its values on the other side, which require no such compensation.

An exemplary embodiment and use of the invention is the so-called curve straightening of an absorbance versus concentration readout of a photometric system, for example, an atomic absorption spectrophotometer. As is well known in spectroscopy the concentration of a radiation-absorbing substance is directly proportional to the absorbance, A, which is defined by the equation: $A = $ the log $(I_0/I)$, where $I_0$ is the intensity of the radiation reaching the sample and I is the intensity of the same radiation transmitted by the sample. Although an electrical signal representing $I_0$ is readily obtainable (either by measuring the intensity of a reference beam bypassing the sample in a double-beam photometric system or by providing an electrical signal equal to the measured radiation passed by a single-beam instrument in the absence of a sample), a signal precisely equal to the true value of I is in practice difficult to obtain. For example, in an atomic absorption spectrophotometer the measured radiation $I_m$ in the sample path includes not only I but an undesired error signal, S, caused by stray radiation (i.e., $I_m = I+S$). As long as the I signal is very large compared to the undesired S signal component, the measured sample signal $I_m$ has only a small percentage error relative to the true I value. Similarly the absorbance actually measured, given by the equation: $A_m = $ the log of $I_0/I_m$ remains reasonably close to and has substantially the same slope as the true absorbance signal A when the I signal is very large as compared to the S error component. However, since the I signal rapidly decreases for linear increasing sample concentration (since I is an anti-logarithmic or exponential function of the concentration) the error component S rapidly becomes a substantial proportion of the measured signal $I_m$ and causes the derived absorbance signal $A_m$ to rapidly depart from the ideal A function. This causes the apparent or measured absorbance $A_m$ to curve substantially when plotted against sample concentration. Techniques to correct or compensate this apparent absorbance $A_m$ to make it conform to the ideal straight line of a true absorbance versus concentration plot are therefore called curve straightening or curve compensation.

Although such compensation techniques have been utilized in the past, all prior systems are believed to use the technique of repetitive reduction of error in the finally obtained absorbance signal. In particular, such techniques effectively cause a point on the curved portion of the apparent absorbance signal to be made coincidental with a point on the ideal absorbance line, then compensate the first adjusted result to cause another point to be made coincident with the ideal absorbance line, then readjust the first point (which has been affected by the second adjustment) and so on until at least a certain range of values of the apparent absorbance curve $A_m$ have been caused to closely approach the ideal straight line. The present invention differs in principle from such prior techniques in that it adjusts only those values of the apparent absorbance curve on one side of (e.g., greater than) a particular onset value so as to cause the adjusted values to fall on a straight line segment which is a continuation of the substantially straight line of the apparent absorbance values on the other side (e.g., less than) the onset value. The primary advantage of the technique of the exemplary embodiment of the invention is that only a single compensating operation is required since this compensation does not affect values on the other side of the onset value.

An object of the invention is the provision of a device for compensating a derived signal to cause it to follow a desired relationship over a particular range of values without affecting an adjacent range of values at which compensation is practically unnecessary.

A more specific object of the invention is the provision of a device according to the above in which the derived signal is obtained from a measured signal and the compensation is caused by algebraically adding to the measured signal a correction signal for values corresponding to the particular range of values of the derived signal.

Other objects, features and advantages of the invention will be obvious ro one skilled in the art upon reading the following description of an exemplary embodiment invention in conjunction with the accompanying drawings, in which:

FIG. 1 is an exemplary graphical representation of the signal being measured ($I_m$) and the significant part of this signal which is desired to be measured (I);

FIG. 2 is a graphical representation of how a logarithmic function of the measured signal varies from a similar logarithmic function of the signal desired to be measured, the latter being a straight line;

Figure 3:
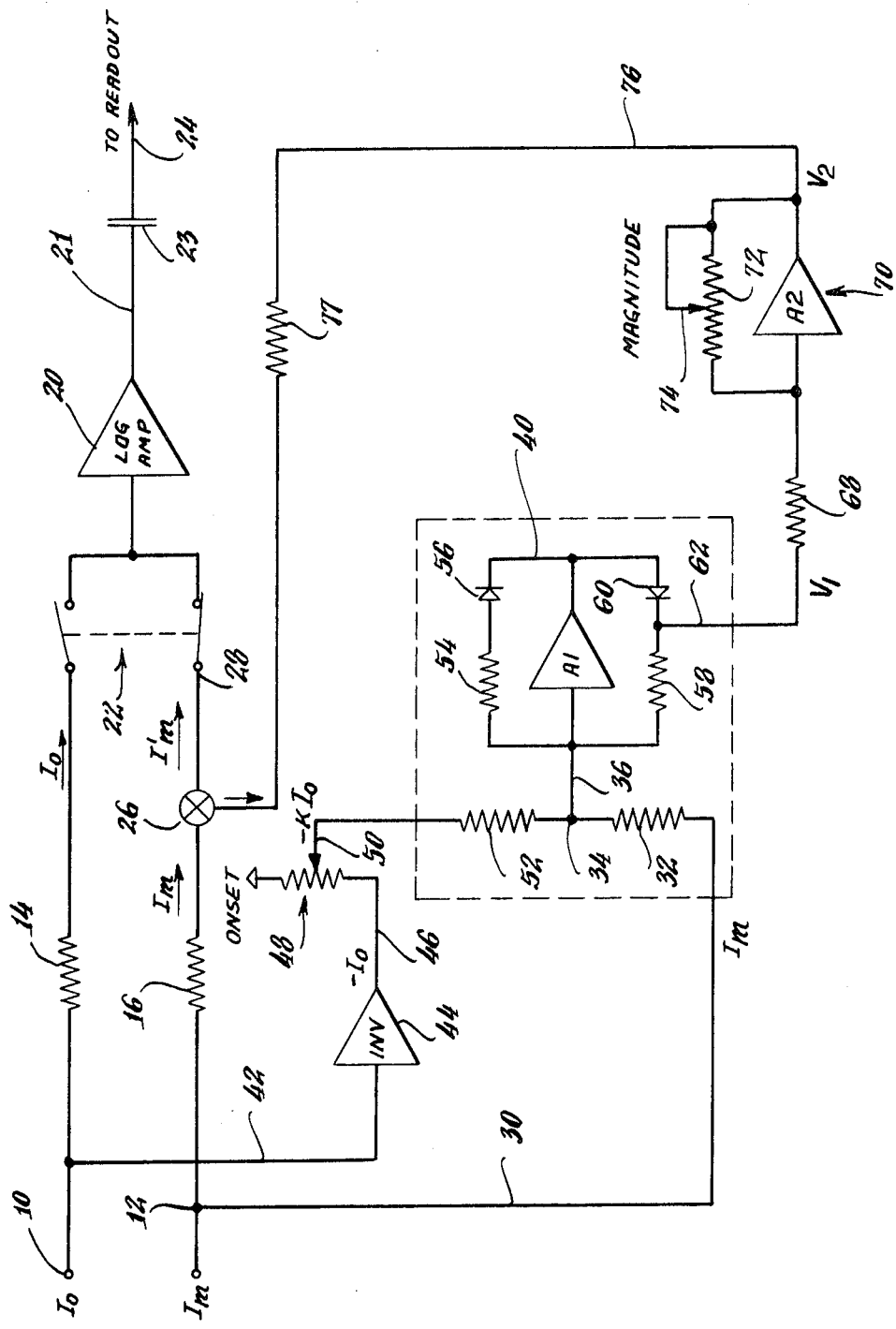
FIG. 3 is a schematic electrical diagram, mostly in block form, of an exemplary apparatus according to the invention.

In FIG. 1, in which all of the numerical values are merely exemplary, an upper curve $I_m$ indicates the manner in which the measured signal actually varies, when it is composed of a varying signal component I which is the physically significant signal plus a constant (in ordinate value) additive error signal S. For purposes of concreteness, the $I_m$ signal is considered the electrical signal obtained from a radiation detector receiving radiation passing through the sample of, say, an atomic absorption spectrophotometer; the I signal component thereof is the contribution to the $I_m$ signal of the monochromatic radiation which the sample element can absorb, while the S component is the (constant valued) stray radiation signal component contributing to the $I_m$ signal. The abscissa is then proportional to concentration of the sample element being measured. The lower curve I represents the absorbable radiation signal desired to be measured, and follows the $I_m$ signal by having an ordinate value at all points equal to $I_m - S$. For convenience, the ordinate scale is assumed to have a maximum value of 10.0 volts and the contribution of the undesired stray light S is assumed to be 0.2 volts, so that the stray light would represent 2 percent of the maximum (100 percent) signal $I_m$, obtained when the sample concentration is zero. Since only the $I_m$ signal is actually measured, its maximum value is considered 100 percent apparent transmission (equal to 10.0 volts on the exemplary scale). The maximum $I_m$ signal (i.e., with a "blank" sample) is made equal to an invariable signal $I_0$, which is either the electrical signal generated by the (same) radiation detector when it receives the reference beam of the double-beam instrument, or a reference voltage in a single-beam instrument. This initial "zeroing" may be caused by any conventional electrical or optical adjustment of either the maximum $I_m$ signal or the $I_0$ signal when the I signal (and therefore $I_m$) is known to be the maximum (e.g., a blank sample is in the instrument). As may be seen by the following Table I, the undesired constant error signal S contributed by stray radiation causes the percentage by which the actual measured signal $I_m$ departs from the physically significant signal I desired to be measured to increase as the I signal becomes smaller. In the exemplary usage, this means that as the absorption by the sample increases (i.e., its transmission decreases) the S signal causes increasing percentage error in how the measured signal $I_m$ departs from the desired (I) measurement.

TABLE I

[$I_m$=I+S. Maximum $I_m$=10.0 volts; S=0.20 volts]

| Apparent transmission, percent | Volts of— | | | Percentage of— | | Exemplary $I'_m$ |
|---|---|---|---|---|---|---|
| | $I_m$ | I | I/$I_m$ | I/$I_m$ | Error | |
| 100 | 10.0 | 9.8 | 9.8/10.0 | 98 | 2 | (10.0) |
| 50 | 5.00 | 4.8 | 4.8/5.0 | 96 | 4 | (5.0) |
| (At point 66) | | | | | | |
| 28.2 | 2.82 | 2.62 | 2.62/2.82 | 93 | 7 | (2.82) |
| 20 | 2.00 | 1.8 | 1.8/2.0 | 90 | 10 | |
| 10 | 1.00 | 0.80 | 0.80/1.00 | 80 | 20 | .871 |
| 5 | 0.50 | 0.30 | 0.30/0.50 | 60 | 40 | |
| (At point 80) | | | | | | |
| 3.8 | 0.38 | 0.18 | 0.18/0.38 | 47.4 | 52.6 | .194 |
| 3 | 0.30 | 0.10 | 0.10/0.30 | 33⅓ | 67⅔ | |
| 2.1 | 0.21 | 0.01 | 0.01/0.21 | 4 | 96 | |
| 2.01 | 0.201 | 0.001 | 0.001/0.201 | ½ | 99.5 | |
| 2.001 | 0.2001 | 0.0001 | 0.0001/2.001 | 0.05 | 99.95 | |
| 2.0000 | 0.20000 | 0.00000 | 0.000/2.000 | 0 | 100 | |

As may be seen from the above Table I, the effect of the undesired stray radiation, S, causes relatively large errors in the apparent transmissivity ($I_m$) relative to the desired to be measured actual transmissivity I whenever the sample exhibits any substantial amount of absorption. In, for example, atomic absorption instruments the final readout is in units of concentration, which is known to be proportional to the actual absorbance, A, caused by the sample. Absorbance A is defined as the logarithm of the ratio of the maximum transmission, $I_0$ divided by the transmission of the actual sample I (i.e., $A = \log I_0/I$). This may be written:

$A = \log I_0 - \log I$. FIG. 2 illustrates the linear relationship between this actual absorbance, A and the concentration of the sample component causing the absorption. The lower curve labelled $A_m$ indicates the manner in which the same mathematical functions varies if $I_m$ (equal to I+S) is substituted for I. Thus, the second curve is given by:

$A_m = \log I_0 - \log (I+S)$, where the same value for S is assumed as above (0.2 volts). Table II sets forth the measured or apparent absorbance $A_m$ and the actual absorbance A for the same values of $I_m$ and I given in Table I.

TABLE II

| Transmission, percent | Log $I_0$-Log (1+S) = $A_m$ | Log $I_0$-Log I = A | Relative error A-$A_m$/A | Percentage error |
|---|---|---|---|---|
| 100 | 1.000-1.000=0 | (1.000)-0.9912=0.0088 | 88/9912= | 0.9 |
| 50 | 1.000-0.6990=0.3010 | (1.0000)-0.6812=0.3188 | 178/3188= | 5.6 |
| 20 | 1.000-0.3010=0.6990 | (1.0000)-0.2553=0.7447 | 457/7447= | 6.1 |
| 10 | 1.000-0.0000=1.000 | (1.000)+(1.0000-0.9031)=1.0969 | 969/10969= | 8.8 |
| 5 | 1.000+(1.000-0.6990)=1.3010 | (1.000)+(1.0000-0.4771)=1.5229 | 0.2219/1.5229= | 14.6 |
| 3 | 1.000+(1.000-0.4771)=1.5229 | (1.0000)+(1.0000-0.0000)=2.0000 | 0.4771/2.000= | 23.9 |
| 2 | 1.000+(1.000-0.3222)=1.6778 | (1.0000)-(-2.0000)=3.000 | 1.3222/3.000= | 43.7 |
| 2.01 | 1.000+(1.000-0.3032)=1.6968 | (1.0000)-(-3.0000)=4.000 | 2.3032/4.000= | 57.5 |
| 2.001 | 1.000+(1.000-0.3012)=1.6988 | (1.0000)-(-4.0000)=5.000 | 3.3012/5.000= | 66 |
| 2.000 | 1.000+(1.000-0.3010)=1.6990 | | (Arbitrarily large) | |

As may be seen from both Table II and FIG. 2 the measured values of $A_m$ depart from the ideal straight line A in such a manner that for absorbance values above about 1.000 the departure becomes substantial, and the apparent absorbance $A_m$ never exceeds a value (of 1.6990), caused by the $I_m$ apparent transmissivity never falling below the value of S. Therefore, $-\log (I+S)$ never becomes greater than 0.6990 or $-(0.30-10-1.000)$. In order to "straighten" the curve $A_m$, the present apparatus eliminates at least that part of the original error in the curve shown in FIG. 1, that causes curvature of $A_m$ in the logarithmic readout according to FIG. 2, over a particular range of values of $A_m$.

FIG. 3 illustrates an electrical device for accomplishing this purpose, namely, by effectively reducing the value of $I_m$ so as to cause the $A_m$ curve in FIG. 2 to be straightened especially at higher values of absorbance. In FIG. 3 the upper input terminal 10 receives the $I_0$ signal, which may either be the electrical signal generated by the detector from the reference beam of a double-beam instrument or an electrical reference signal of a single-beam instrument. The lower input 12 receives the $I_m$ signal, and it is assumed that these signals have been made equal (e.g., by adjusting the effective gain in a circuit amplifying either at a time when the signals "should" be equal, i.e., when a "blank" sample solution is fed to an atomic absorption spectrophotometer). Without utilizing the invention, these signals would be alternately fed through identical resistors 14, 16 to a logarithmic amplifier 20 through a switching arrangement (schematically represented by switches 22). The output 21 of logarithmic amplifier 20 would therefore have an a.c. signal having alternate levels equal to log $I_0$ and log $I_m$. After passing through coupling capacitor 23, this a.c. signal would normally be rectified (as by demodulation synchronous with switches 22), not shown, to yield at output 24 a d.c. signal equal to the difference between the logarithms of the two original signals (i.e., $A_m$=log $I_0$-log $I_m$=log $I_0/I_m$). To accomplish the curve straightening desired, the remaining parts of the device shown in FIG. 3 effectively subtract a voltage from $I_m$ at summing point 26 so as to cause the lower input 28 of the log amplifier to receive a signal $I'_m$ substantially closer than $I_m$ to the desired I over the corrected range.

To accomplish this, the $I_m$ signal is supplied by lead 30 across a resistance 32 to a junction point 34 connected to the input 36 of a unidirectional differential amplifier circuit 40. The $I_0$ signal is fed by lead 42 through inverter 44 so as to form a $-I_0$ signal at its output 46. A variable potentiometer 48 picks off at variable tap 50 a proportion of this voltage, namely, $-kI_0$ which is fed through a resistor 52 identical to resistor 32 to point 34 and input 36 of the unidirectional differential amplifier circuit 40. This amplifier circuit comprises two feedback loops, the upper one of which includes a resistor 54 and a diode 56; while the lower feedback loop includes an identical resistor 58 and a diode 60 which is oriented in the opposite direction (but otherwise is identical) to diode 56. Because of the opposite direction orientation of the diodes, the effective amplifier voltage $V_1$ at output 62 will be at zero volts whenever the absolute value of $I_m$ is larger than the absolute value of $kI_0$; while the voltage $V_1$ will be equal to the absolute value of $kI_0$ minus the absolute value of $I_m$ whenever the absolute value of $I_m$ is smaller than the absolute value of $kI_0$.

The operator adjusts the tap 50 of potentiometer 48 hereinafter referred to as the "onset" adjustment so as to cause the absolute value of $-kI_0$ to be set at the value at which curve straightening is desired to be started (i.e., $-kI_0$ is equal but of opposite sign to the particular onset value of $I_m$ at which such curve straightening should commence). For exemplary purposes it will be assumed that this corresponds to point 64 shown in FIG. 2, which in turn approximately corresponds to point 66 shown in FIG. 1. Once the operator has so set this "onset" (or beginning of curve correction) voltage, the unidirectional differential amplifier 40 will cause curve correction of all values of $I_m$ smaller than this onset voltage, (i.e., $I_m - kI_0 < 0$) namely, all values on curve $I_m$ in FIG. 1 below and to the right of point 66, and therefore all values of $A_m$ in FIG. 2 above and to the right of point 64 in the assumed example. Of course these corresponding points 66 and 64 represent substantial diminishing of both the $I_m$ and I signals in FIG. 1 from their maximum values, so that this onset adjustment is accomplished in the exemplary usage when a known absorbing sample is present in the instrument to cause this particular value of $I_m$. For exemplary purposes it will be assumed that this onset adjustment is made with a known sample concentration of five parts per million of nickel (in an atomic absorption instrument which is set up for determining nickel concentration).

The output $V_1$ in FIG. 3 is fed through an input resistor 68 to a variable gain amplifier 70, which may comprise a variable resistor 72 in the feedback loop, the effective value of which may be adjusted by a manually variable tap 74. This adjustment obviously affects the gain of the amplifier and therefore determines the value of its output voltage $V_2$ on output lead 76. Assuming both the first and second amplifying circuits 40, 70 cause inversion, $V_1$ will always be positive (or zero) and $V_2$ always negative (or zero), since the unidirectional amplifier circuit 40 will only have an output (i.e., $V_1$ not zero) when its input is negative (i.e., $-kI_0$ is larger in absolute value than the positive $I_m$). The negative voltage $V_2$ is fed back through resistor 77 to summing point 26 so as to be subtracted from (i.e., algebraically added to) the voltage caused by the input signal $I_m$.

The magnitude adjustment is accomplished with a more concentrated known sample (e.g., 15 parts per million nickel) corresponding to point 78 in FIG. 2 (which in turn corresponds to point 80 in FIG. 1). Since these higher concentration points are necessarily beyond the onset points 64 and 66 previously mentioned, the unidirectional differential amplifier circuit 40 will be producing a (positive) output voltage $V_1$, so that the operator by adjusting the gain of the second amplifier 70 and therefore the (negative) voltage $V_2$ causes movement of the point 78 in FIG. 2 along the vertical line 82 until the absorbance (and therefore the linearly related concentration) indicated at readout 24 in FIG. 3 is exactly three times that read out at point 64 (assuming that the higher concentration standard is three times as concentrated as is true in this example).

This relationship will occur at, for example, point 84 which has an ordinate value of three times that of point 64. It should be noted that the device and technique of the invention does not attempt to correct point 78 to its absolutely "correct" value (indicated at point 88 in FIG. 2) but rather makes a correction relative to the onset point 64. Since the important criterion is that the points (e.g., 64 and 84) have their relative ordinate values proportional to those of the "correct" line A, it is only necessary that the values be corrected to a straight line ($A'_m$) segment (as at 90) having the same slope as at point 64. The circuit of the invention for all points in FIG. 1 on curve $I_m$ between points 66 and 80 will now subtract a quantity ($V_2$) which is equal to the adjusted gain of circuit 70, say, M, times the difference between $I_m$ and the adjusted value of the onset voltage $-kI_0$ (which is the value of $I_m$ at point 66). Thus, $V_2 = M(-kI_0 + I_m)$, for all values of $I_m$ smaller than the chosen onset point (e.g., point 66 in FIG. 1) and is of course zero for all values of $I_m$ greater than that at point 66. Since the corrected value $I'_m$ equals $I_m$ plus the (negative or zero) $V_2$, $I'_m = I_m + M(-kI_0 + I_m) = I_m - M(-kI_0 - I_m)$ when the expression in the parenthesis is greater than zero and $kI_0$ is the "onset" value of $I_m$ (e.g., at point 64, 66). That such correction accomplishes the desired straightening of the logarithmic function (e.g., to line 90 in FIG. 2) may best be seen from the following example.

In atomic absorption spectroscopy use, the output is first zeroed by using a "blank" sample, and then the constant of proportionality between the absorbance and the concentration of the particular sample element being tested is empirically determined (by "testing" a known standard sample) and then set as a linear gain between absorbance output 24 in FIG. 3 and a readout such as a linear voltmeter (see, for example, applicant's U.S. Pat. application "Automatic Gain Calibration" filed on Mar. 1, 1971 bearing the Ser. No. 119,585). After such setting up but not utilizing the present circuit, a 5-part per million standard nickel solution was aspirated into the atomic absorption instrument so as to obtain at the logarithmic output (24 in FIG. 3) an absorbance (e.g., at point 64 in FIG. 2) which was multiplied by a factor to make the final readout 5.00 parts per million (by adjusting the gain of the amplifier between output 24 and the meter, not shown). A 15-part per million standard solution of nickel was then tested (with the same proportionality setting between absorbance and concentration), and the read concentration was 12.05 parts per million (corresponding to an absorbance like that at point 78 in FIG. 2).

The onset tap 50 was then adjusted to just cause the onset voltage $V_2$ to be zero with the 5-part per million standard again being used. This is preferably done at a large gain factor of the second amplifier circuit 70 to simplify finding the correct adjustment of tap 50, and the tap 50 moved to the point where the final readout is just affected. The 15-part per million standard was then "tested" and the magnitude adjustment tap 74 moved until the final concentration voltage read 15.00, that is, exactly 3 times that of the lower standard (e.g., corresponding to the absorbance at point 84 in FIG. 2). A 10-part per million nickel standard was then "tested" and yielded a reading of exactly 10.00 parts per million (i.e., 0.1 percent precision), proving that the device did in fact straighten the absorbance curve at least between the 5-and 15-part per million concentration values (e.g., say, points 64 and 84 on adjusted line 90), as indicated by point 92 corresponding to the corrected 10-part per million value.

Since it is desired to obtain a straight line having a constant slope (e.g., that of the substantially straight line portion of $A_m$ at point 64 in FIG. 2), it is only necessary to make the line segment 90 equal to the partially corrected absorbance $A'_m$, given by $A'_m =$ the log of $I_0/I'_m$, where $I'_m$ is proportional to the true diminished intensity of the light caused by actual absorption by the sample. Thus, $I'_m$ should be equal to $I+KI$ where $K$ is a constant to cause $A'_m$ to follow the straight line segment 90 (and therefore have values that are directly proportional to the true absorption of the sample). In other words, the partially corrected measured absorbance $A'_m$ (at least along line segment 90) will be proportional to the actual concentration of the sample but at a somewhat different proportionality factor than the true absorbance line $A$. Since the proportionality factor between absorbance and concentration is empirically set by adjusting gain between the absorbance readout 24 of FIG. 3 and the final concentration readout (as at point 64), the partially corrected "curve" $A'_m$ will give the correct concentration once the "correct" gain factor (for this line) has been chosen (as may be seen by the numerical example above).

We therefore wish to make the partially corrected apparent intensity signal $I'_m$ be equal to $I+KI$ for values of $I_m$ less than those at a particular onset value $I_{ma}$ (corresponding, for example, to point 66 in FIG. 1), so as to generate the straight line $A'_m$ for all values of the absorbance greater than those corresponding to such onset point (e.g., point 64 in FIG. 2). Thus, $$I'_m = I_m - V_2 = I + KI, \text{ or}$$
$$I'_m = I_m + M(-kI_0 + I_m) = I + KI$$
$$I'_m = I_m - M(kI_0 - I_m) = I + KI.$$

Since $I_m$ always equals $I+S$ and since $kI_0$ will be set to the desired onset value, $I_{ma}$, this may be written as:

$$I'_m = I + S - M(I_{ma} - I_m) = I + KI.$$

Subtracting $I$ from the two right-hand terms of the above equation, we may write;

$$S - M(I_{ma} - I_m) = KI.$$

Since:

$$I_{ma} - I_m = (I_a + S) - (I + S) = I_a - I$$

where $I_a$ is (as at point 96 in FIG. 1) the true value of $I$ corresponding to the onset value ($I_{ma}$ at point 66 in FIG. 1) chosen on the measured $I_m$ curve. Substituting this in the last equation, we obtain:

$$S - M(I_a - I) = KI.$$

At the onset point where $I_m = I_{ma}$ and therefore $I = I_a$, $S = KI$; while for values of $I_m$ or $I$ smaller than the corresponding onset value of $I_{ma}$ or $I_a$, the correction term, $-M(I_{ma}-I_m)$ or $-M(I_a-I)$ always causes the left-hand term of the above equation to be reduced so that it remains proportional to $I$. To make $S-M(I_a-I)$ or $S-MI_a+MI$ always equal to $KI$, $S-MI_a$ must equal 0. Therefore $S=MI_a$, so that $M=MI_a$, so that $M=S/I_a$. We therefore write:

$$S - (S/I_a)(I_a - I) = KI.$$

Since $I_a - I$ measures the departure in absolute value of $I$ from the onset value $I_a$, the expression $I_a - I/I_a$ yields the relative or percentage departure of $I$ from $I_a$. If this quantity is then multiplied by $S$, the product will yield a correction factor which when subtracted from $S$ will cause the lefthand term of the above equation to remain proportional to $I$ for values of $I$ smaller than $I_a$. Again noting that $$I_a - I = I_{ma} - I_m$$

we may write the equation in the following forms:

$$S - (S/I_a)(I_a - I) = KI$$
$$S - S/I_a (I_{ma} - I_m) = KI$$
$$S(1 - (I_{ma} - I_m)/I_a) = KI$$

That this proportional diminishment of the $S$ error signal accomplishes this desired purpose may best be seen from a numerical example.

Using the Table I the assumed onset value (at point 66 in FIG. 1) as the $I_{ma}$ and $I_a$ values and using for the lowered value $I_m$ that of point 80, we may substitute into the above equations these numerical values. Thus, $I_a = 2.62$ and $I_a - I = 2.62 - .18 = 2.44$; it may be noted that $I_{ma} - I_m$ is 2.82—0.38 or the same 2.44. Thus, substituting in the last equation above, these numerical values yield:

$$S(1 - 2.44/2.62) = KI$$
$$S(1 - 0.93) = KI$$

Since $S$ is 0.20, the last expression equals $0.20(1-0.93)$ $= 0.20-0.186 = 0.014$. Thus, the partially corrected $I'_m$ signal corresponding to uncorrected $I_m$ signal at point 80 in FIG. 1 will be $0.18+0.014 = 0.194$. Dividing the true (not found) $I$ value of 0.18 by this partially corrected value gives $0.18/0.194 = 0.93 = 93$ percent of the true value. Thus, the partially corrected $I'_m$ value corresponding to the uncorrected value at point 80 in FIG. 1, which yielded the value for $A'_m$ shown at point 84 in FIG. 2 has the same relationship to the true value of $I$ (that is, 93 percent of 0.18) as did the true (but not found) $I$ value (namely, 2.62) have to the measured value $I_m$ at point 66 in FIG. 1 (corresponding to point 64 in FIG. 2).

Assuming the same onset point, the partially corrected value $I'_m$ at 10 percent apparent absorption may be obtained from Table I by substituting into the expression $S(1-I_{ma}-I_m)/I_a$ the appropriate values:

0.20 (1−2.82−1.00/2.62)

= 0.20(1−1.82/2.62)

= 0.20 (1−0.645) = 0.20−0.129 = 0.071

Thus, the partially corrected value $I'_m$ corresponding to the originally measured 10 percent value (of 1.00) in the true value of I of 0.80 would be 0.80+0.071 = 0.871. The true value relative to the partially corrected value is therefore 0.80/0.871 = 0.93 or 93 percent. Thus, in general for the exemplary numerical example, the partially corrected value $I'_m$ (appearing at 28 in FIG. 3) will be the same proportion (in this case 1/0.93) of the true I value even though the latter is never actually found. Accordingly, the partially corrected "curve" 90 in FIG. 2 will be a straight line having the same slope as the measured curve had at point 64 in FIG. 2. Therefore, once the correct gain has been set to make point 64 represent the known concentration (e.g., 5 parts per million), the same gain factor will cause the partially corrected absorbance values $A'_m$ to be proportional by exactly the same gain factor to concentration (at least up to point 84). The invention thus accomplishes the desired purposes of straightening what would be the measured absorbance curve $A_m$ in FIG. 2 to a straight line $A'_m$ at 90 in FIG. 2 with the operator merely having to set the M to cause a known concentration to read correctly relative to the calibrated known onset concentration (e.g., make point 84 in FIG. 2 three times as large as point 64 assuming a 15-part per million standard was used for the magnitude adjustment and a 5-part per million standard was used for the onset adjustment).

What is claimed is:

1. Apparatus for linearizing a second derived signal over a range of values relative to a final function for undesired deviation in said second derived signal caused by an undesired signal component of substantially constant amplitude in a first measured signal from which said second signal is derived according to a first logarithmic relationship, comprising:

means for establishing an onset value of said first measured signal, at which compensation of said second derived signal is desired for values of said first measured signal departing in one direction of magnitude from said onset value, said undesired constant amplitude component causing a specific percentage error at said onset value;

means for forming a correction signal varying as a second mathematical function of said first measured signal for values thereof different from said onset value in said one direction, said correction signal being zero for values of said first measured signal both at and departing from said onset value in the other direction of magnitude, and said correction signal when algebraically added to said undesired signal component in said first measured signal causing the resultant to be proportional to said first signal free of said constant undesired signal component;

and means for algebraically combining said correction signal and said first measured signal, whereby said second derived signal is linearized relative to said final function over a range of values corresponding to said first measured signal departing from said onset value in said one direction, without affecting said second derived signal for other values corresponding to said first measured signal at and departing from said onset value in said other direction of magnitude, thereby avoiding any need to eliminate any over-compensation of such other values of said second derived signal.

2. Apparatus for compensating a second derived signal over a range of values for undesired deviation in said second derived signal caused by an undesired signal component in a first measured signal from which said second signal is derived according to a first mathematical relationship said undesired signal component being of substantially constant amplitude, so that the relative percentage error caused thereby in said first measured signal is inversely proportional to the value of said first measured signal, comprising:

means for establishing an onset value of said first measured signal, at which compensation of said second derived signal is desired for values of said first measured signal, departing in one direction of magnitude from said onset value, said onset value being a particular value of said first measured signal, so that said constant amplitude component causes a specific percentage error at said onset value;

means for forming a correction signal varying as a second mathematical function of said first measured signal for values thereof different from said onset value in said one direction, said correction signal being zero for values of said first measured signal both at and departing from said onset value in the other direction of magnitude;

said forming means comprising means for generating, for values of said first measured signal less than said onset value, a correction signal equal to the amount said first measured signal falls below said onset value multiplied by a proportionality factor;

said forming means further comprising means for setting said proportionality factor to such value that the difference between the absolute value of said correction signal and the absolute value of said constant undesired signal component is proportional to said first signal free of said constant undesired signal component;

and means for algebraically combining said correction signal and said first measured signal;

said algebraic combining means effectively subtracting said absolute values of said correction signal from the absolute value of said constant amplitude undesired signal component in said first measured signal, whereby the resulting compensated first signal is made at least proportional to the first signal free of said constant undesired signal component, so that said second derived signal is compensated over a range of values corresponding to said first measured signal departing from said onset value in said one direction, without affecting said second derived signal for other values corresponding to said first measured signal at and departing from said onset value in said other direction magnitude, thereby avoiding any need to eliminate any over-compensation of such other values of said second derived signal.

3. Apparatus according to claim 2, in which:

said forming means comprises a unidirectional amplifier means for generating a departure signal proportional to the extent said first measured signal departs in said one direction of magnitude from said onset value.

4. Apparatus according to claim 3, in which:
said forming means further comprises a variable amplifier means for multiplying said departure signal by said proportionality factor.

5. Apparatus according to claim 2, in which:
said first mathematical relationship is such that said second derived signal would be a straight line if said first measured signal were completely free of said constant amplitude undesired signal component,
said second signal derived from said compensated first signal thereby being also a straight line.

6. Apparatus according to claim 2, in which:
said constant amplitude undesired signal component is positive so as to increase said first measured signal;
said correction signal is negative;
and said algebraic combining means algebraically adds said correction signal to said first measured signal.

7. Apparatus according to claim 2, in which:
said first mathematical relationship is a logarithmic relation and said second derived signal would be a straight line if said first measured signal were completely free of said constant amplitude undesired signal component,
said signal derived from said compensated first signal thereby being also a straight line.

8. Apparatus according to claim 7, in which:
said second derived signal is apparent absorbance $A_m$, and the first measured signal is apparent transmission $I_m$ of radiant energy by a material;
the first mathematical relationship is $A_m = \log I_o - \log I_m$, where $I_o$ is the intensity of the radiant energy incident on the material;
said first apparent transmission signal $I_m$ is equal to the actual transmission, $I$, plus the undesired stray radiation signal component, $S$;
and said correction signal compensates the original apparent transmission signal, $I_m = I + S$, to a compensated transmission signal $I'_m$ which is proportional to the actual transmission, $I$, of said material.

* * * * *